(12) United States Patent
Westbrook

(10) Patent No.: US 7,735,184 B2
(45) Date of Patent: Jun. 15, 2010

(54) WIPER BLADE FOR CLEANING GLASS OR POLYMERIC WINDSHIELDS

(76) Inventor: Donald William Westbrook, 29943 Mayflower Dr., Canyon Lake, CA (US) 92587

( * ) Notice: Subject to any disclaimer, the term of this patent is extended or adjusted under 35 U.S.C. 154(b) by 222 days.

(21) Appl. No.: 11/503,820

(22) Filed: Aug. 14, 2006

(65) Prior Publication Data

US 2008/0034529 A1 Feb. 14, 2008

(51) Int. Cl.
*B60S 1/28* (2006.01)
*B60S 1/38* (2006.01)

(52) U.S. Cl. ............... 15/250.41; 15/250.48; 15/245

(58) Field of Classification Search ......... 15/250.48, 15/250.41, 250.4, 245, 250.361; D12/219, D12/220
See application file for complete search history.

(56) References Cited

U.S. PATENT DOCUMENTS

| | | | | | |
|---|---|---|---|---|---|
| D28,990 | S | * | 7/1898 | Cumming | D32/41 |
| D100,790 | S | * | 8/1936 | Oishei | D32/41 |
| D100,791 | S | * | 8/1936 | Oishei | D32/41 |
| 2,140,453 | A | * | 12/1938 | Horton | 15/250.48 |
| 2,733,469 | A | * | 2/1956 | Oishei | 15/250.4 |
| 2,834,976 | A | * | 5/1958 | Oishei | 15/250.4 |
| 2,952,865 | A | * | 9/1960 | Rohr et al. | 15/250.48 |
| 3,040,359 | A | * | 6/1962 | Deibel | 15/250.48 |
| 4,208,758 | A | * | 6/1980 | Timmis et al. | 15/250.04 |
| 4,317,251 | A | * | 3/1982 | Priesemuth | 15/250.41 |
| 5,048,146 | A | * | 9/1991 | Cavenago | 15/250.48 |
| 5,398,371 | A | * | 3/1995 | Oyama | 15/250.41 |

FOREIGN PATENT DOCUMENTS

| | | | |
|---|---|---|---|
| EP | 0744326 | * | 11/1996 |
| GB | 2234161 | * | 1/1991 |

* cited by examiner

*Primary Examiner*—Gary K Graham
(74) *Attorney, Agent, or Firm*—Michael Klicpera

(57) ABSTRACT

Embodiments of the present invention include a windshield wiper comprising preferably of a dual blade design wherein a portion of the outside surface of each blades has a specific scrubbing configuration molded within or attached to outside surfaces of the one or more protruding blade components. The inside surface of each blade protruding component preferably has a smooth finish but for certain applications, may include the specific scrubbing configuration molded within or attached to one or more protruding blade components. The primary embodiment utilizes a plurality of triangular scrubbing configuration the projects from the outside surface of each blade. The triangular scrubbing configuration functions by engaging and impinging a piece of debris with the tip or point of the triangular configuration. The piercing small radius is followed by the wider section of the triangular configuration, which functions to split and shatter the engaged piece of debris. It is contemplated by the Applicant that another plurality of scrubbing-configurations such as a diamond or hexagon shape can be utilized to achieve the advantages of the present Invention. Furthermore, it is also contemplated by the Applicant that different scrubbing configurations can comprise the plurality of scrubbing projections.

24 Claims, 2 Drawing Sheets

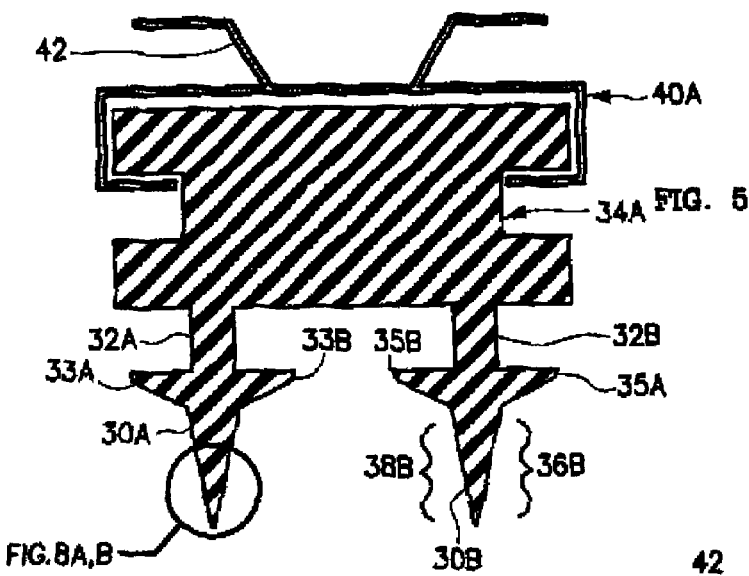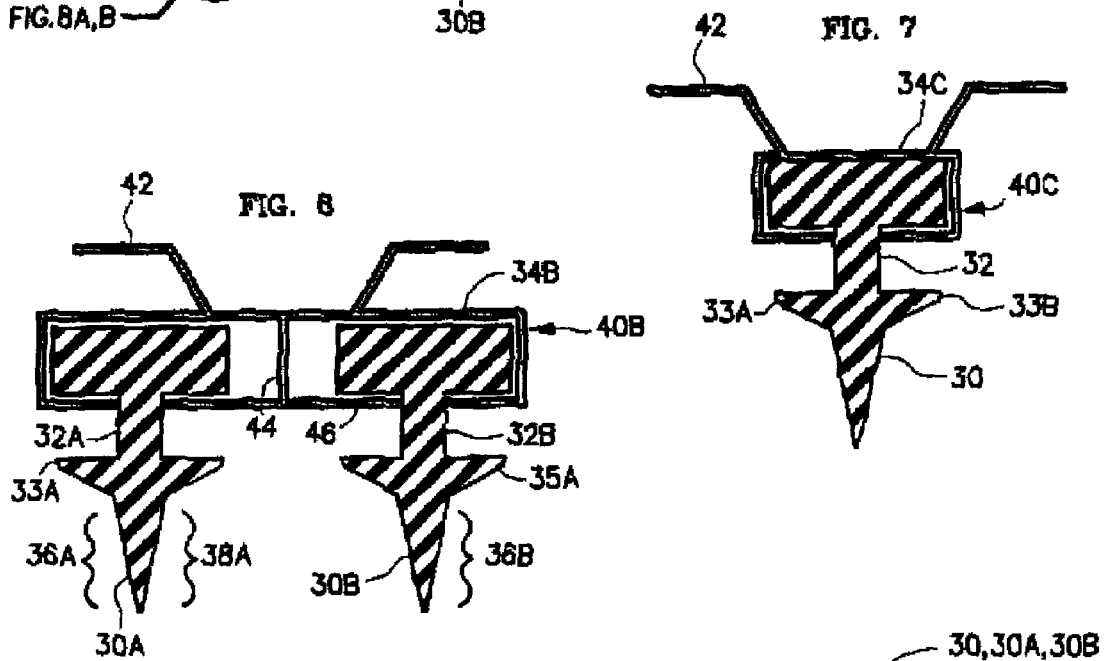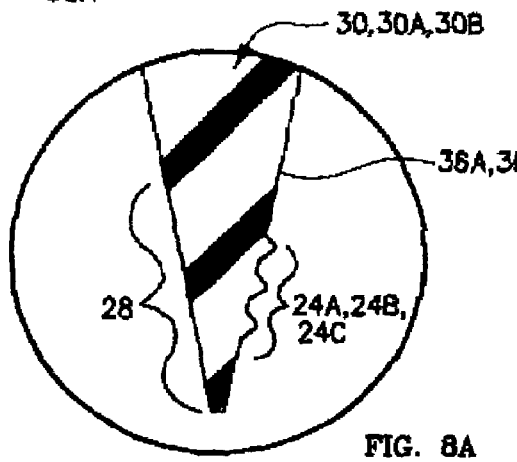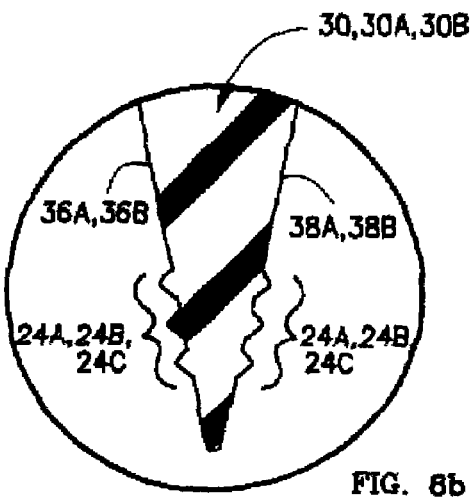

WIPER BLADE FOR CLEANING GLASS OR POLYMERIC WINDSHIELDS

FIELD OF THE INVENTION

The invention relates to a wiper blade for cleaning glass and polymeric surfaces. More specifically, the invention relates to a novel blade design that functions to remove debris more effectively than other blade designs.

BACKGROUND OF THE INVENTION

Windshield wipers are an important safety feature a automobiles, trucks, motorcycles, buses, trains, and any other vehicle that includes a glass or polymeric windshield and is subject to rain, snow, ice, insects, tree sap, dirt, mud and the like. Windshield wipers typically include a longitudinal frame and one or more flexible squeegees running along the length of the frame. The frame is usually held by a motorized arm that sweeps the wiper across the windshield with the squeegee in contact with the windshield surface in order to sweep away rain, snow, and other debris so that the driver has a clear view in front of their vehicle.

Wiper blades for cleaning glass and polymeric surfaces on vehicles are known in highly varied configurations. Among them the so-called flat wiper blades are particularly known; they consist basically of a wiper blade body manufactured from a flexible rubber material and of support splines or spring splines engaging in a lateral longitudinal grooves in the wiper blade body, which are then attached at both ends of the wiper blade body along with it to the wiper blade by means of end caps.

It is also known in the case of windshield wipers for the wiper blade body to he configured as an airfoil on its upper side facing away from the lip and thus from the glass or polymeric surface to he cleaned, that is to say, with an inclined surface whose plane in the particular application Includes an angle smaller than 90 degree with the plane of the glass or polymeric surface, or with a correspondingly concave curved incline.

It is additionally known for wiper blades to provide a distribution passage inside the wiper blade body extending in the longitudinal direction of the wiper blade for a cleaning or washing fluid, where discharge openings are provided at the end caps at both ends of the wiper blade to discharge the cleaning or washing fluid onto the glass surface.

Furthermore, it is known that there are wiper blades that employ additional elements, such as a brush, to assist removing debris from the windshield. One such design comprises at least two longitudinally extending flexible squeegees and a longitudinally extending brush channel between the two squeegees on a front side of the molded frame.

Many vehicles also include a mechanism for providing a cleaning fluid to the windshield to assist the wiper blade in removing the debris. When the windshield compromises the driver's forward visibility, the driver cleaning fluid to be projected onto the windshield, and the wipers mechanically assist in the cleaning action. Cleaning fluid may be provided from a nozzle on or near the hood of the vehicle, or otherwise in proximity to the outside windshield surface. Or, some vehicles and after-market kits make it possible to provide cleaning fluid directly through the windshield wiper frame. In this way, the cleaning fluid is deposited directly to the windshield, and is less likely to he blown away from the vehicle by wind when the vehicle is moving, and is also advantageously distributed more widely across the windshield surface as the wipers sweep.

Additionally, many modern windshield wipers are employing aerodynamic technology by maintaining close contact between the windshield surface and the wiper blades. However, they do not take advantage of the wind available at moderate to high vehicle speeds to assist in the distribution of cleaning fluids and the removal of liquids from the windshield surface.

However, even with currently designed windshield wipers, ice, dirt, insects and other debris remain on the windshield despite the sweeping action of the windshield wiper, obscuring the drivers view. As a result, drivers occasionally are required to stop their vehicle, and manually clean stubborn debris from the windshield, in order to improve visibility through the windshield.

The invention described herein provides an improved windshield wiper that more effectively removes solid and liquid debris from the windshield, allowing for improved visibility, and thereby increased safety.

SUMMARY OF THE INVENTION

Embodiments of the present invention include a windshield wiper comprising preferably of a dual blade design wherein a portion of the outside surface of each blade has a specific scrubbing configuration molded within or attached to the outside surfaces of the one or more protruding blade components. The inside surface of each blade protruding component preferably has a smooth finish but for certain applications, may include the specific scrubbing configuration molded within or attached to one or more protruding blade components. The primary embodiment utilizes a plurality of triangular scrubbing configuration the projects from the outside surface of each blade. The triangular scrubbing configuration functions by engaging and impinging a piece of debris with the tip or point of the triangular configuration. The piercing small radius is followed by the wider section of the triangular configuration, which functions to split and shatter the engaged piece of debris. It is contemplated by the Applicant that another plurality of scrubbing configurations such as a diamond shape can be utilized to achieve the advantages of the present invention. Furthermore, it is also contemplated by the Applicant that different scrubbing configurations can comprise the plurality of scrubbing projections.

BRIEF DESCRIPTION OF THE DRAWINGS

FIG. 5 is a cross sectional view of the present invention showing the support structure and having a plurality of specifically configured blades extending from a single piece base structure.

FIG. 6 is a cross sectional view of the present invention showing the support structure and having a plurality of specifically configured blades extending from a multiple piece base structure.

FIG. 7 is a cross sectional view of the present invention showing the support structure and having one specifically configured blade extending from a single piece base structure.

FIG. 8a is a magnified view of a blade with an inside and outside surface near the window interface and having the specifically specific scrubbing configurations projecting from the outside surface of the blade.

FIG. 8b is a magnified view of a blade with an inside and outside surface near the window interface and having the specifically specific scrubbing configurations projecting from the both the inside and outside surface of the blade.

DESCRIPTION OF THE PREFERRED EMBODIMENTS

Figure 1:
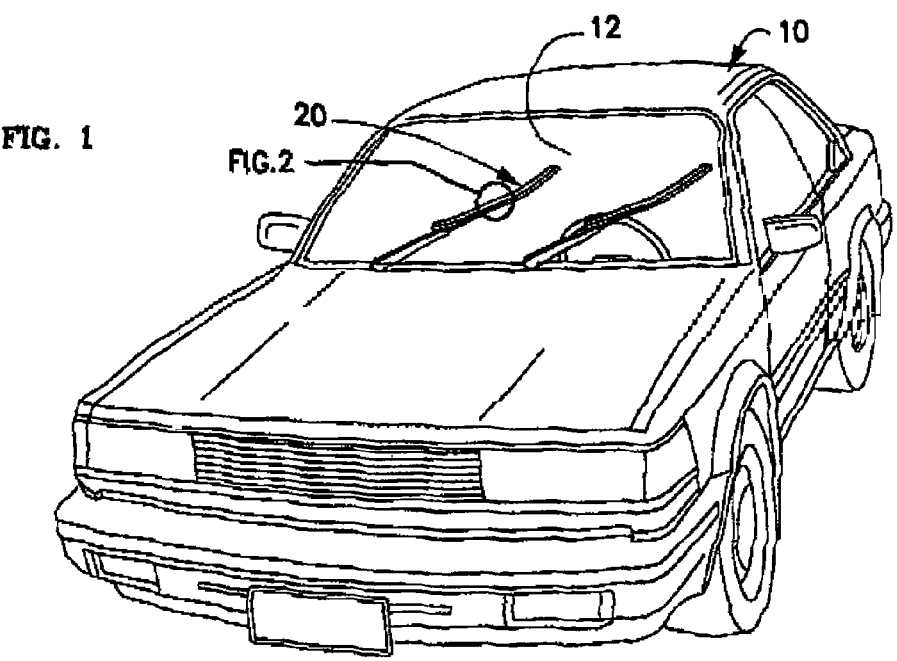
FIG. 1 is a perspective view of the present invention as used in its typical environment and method.
Figure 2:
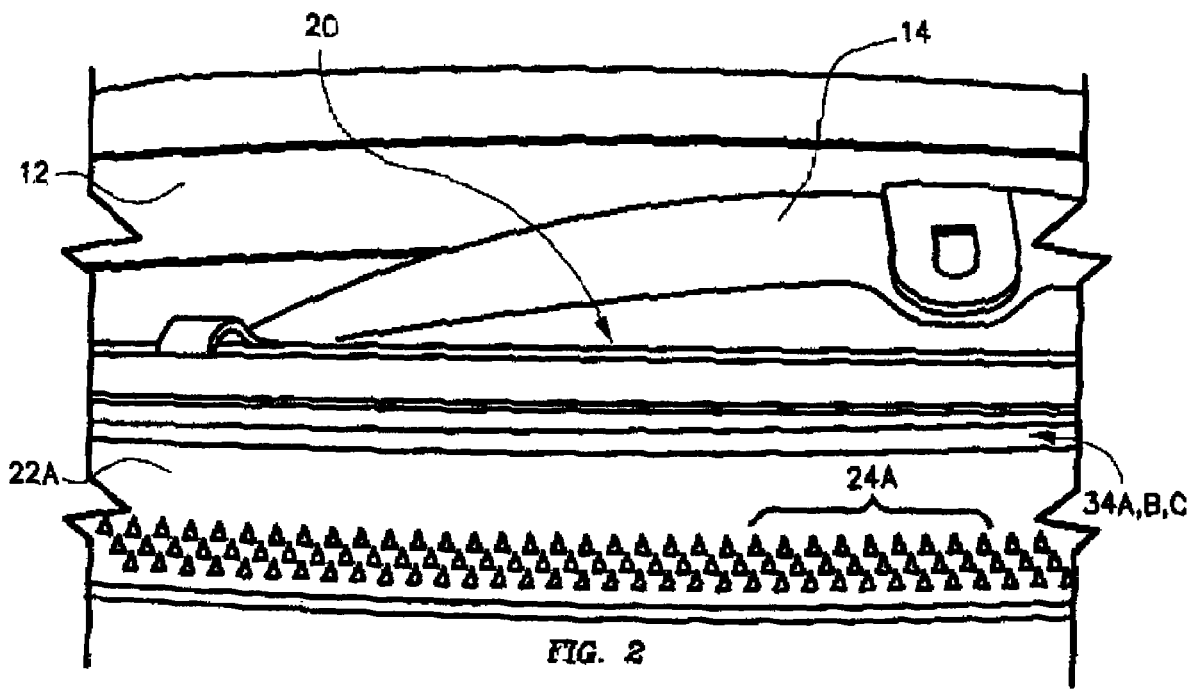
FIG. 2 is a partial sectional view of the present invention taken from FIG. 1 and showing the support structure and the specific scrubbing configuration projecting from one of the blades surfaces near the window interface for the primary embodiment.

The present invention wiper blade 20 as indicated in FIGS. 1 and 2 is attached to a band-like, elongated, spring-elastic support element 14, which encapsulates a portion of the base 34 that is disposed in a longitudinally parallel fashion within typical groove structure of the spring-elastic support element 14. FIG. 1 shows a perspective view of the present invention as used in its typical environment whereby the present invention is engaged to a rotating arm 16 that is a mechanism of a vehicle, such as a car 10. The vehicle can also be a truck, motorcycle, snow mobile or other vehicle that has a windshield 12 that periodically needs to be cleaned of debris. On the top side of the support element 14, which is also referred to as a spring bar, the center section of this part is provided with the wiper blade connecting device, with the aid of which the present invention wiper blade 20 can be detachably connected in an articulating fashion to a driven wiper arm. To that end, the free end of the wiper arm is provided with the wiper arm connecting device. The wiper arm is loaded in the direction toward the window to be wiped, for example the windshield of a motor vehicle 12, whose surface to be wiped or cleaned of debris.

Due to the pressure applied to the wiper blade over its entire length against the windshield 12, stress is caused to be built up in the spring-elastic support element 14, which is typically made of metal, which stress produces a uniform contact of the wiper blade 20 over its entire length against the window and produces a uniform distribution of the pressure. The present invention wiper blade 20 is designed to engage the windshield 12 of the vehicle 10 and then moved across the windshield in a fashion controlled by the rotating arm. Embodiments of the present invention include a windshield wiper comprising preferably of a dual blade design wherein a portion in close proximity to window surface of each blade has a specific scrubbing configuration molded within or attached to outside surfaces of the blade component. The inside surface of each blade protruding component preferably has a smooth finish but for certain applications, may include the specific scrubbing configuration molded within or attached to one or more protruding blade components.

Three embodiments of the present invention wiper blade 20 will be explained in more detail below in conjunction with FIGS. 2 to 4. Referring to FIG. 2, the present invention wiper blade 20 is attached to a band-like, elongated, spring-elastic support element 14, which encapsulates a portion of the base 34 that is disposed in a longitudinally parallel fashion within typical groove structure of the spring-elastic support element 14. Also shown on one of the sloping surfaces 22, extending from the base is a blade component with a plurality of specific scrubbing configurations 24a molded within or attached to the sloping surface 22a that is in close proximity to the windshield surface 20. In this primary embodiment, a plurality of triangular shaped scrubbing configurations 24a project from the outside surface of each blade is employed. The plurality of triangular shaped scrubbing configurations 24a function by first engaging and impinging a piece of debris with the tip or pointed end of the triangular shaped configuration 24a. Then the piercing small radius is followed by the wider section of the triangular shaped configuration 24a, which functions to split and shatter the engaged piece of debris. As shown in this FIG. 2, three rows of triangular shaped scrubbing configurations 24a are used to perform the additional wiping and cleaning operations. It is contemplated by the Application that more or less than the three rows of triangular shaped scrubbing configurations 24a can be utilized.

The plurality of triangular shaped scrubbing configurations 24a can be molded into the blade design and fabricated from the same material as the base strip 34. In addition, the plurality of triangular shaped scrubbing configurations 24a can fabricated from a different material than the base material and attached to the portion of the blade by standard techniques, e.g. heat or adhesive attachments technology. In this example the triangular shaped scrubbing configurations 24a can be fabricated from a number of materials, such as natural rubber or silicone materials while the base strip is fabricated from another material. Alternately the triangular shaped scrubbing configurations 24a can be fabricated from a synthetic or composite compound or halogen-hardened natural compound that lengthens the triangular scrubbing configurations 24a life by reducing fatigue attributed to abrasion, temperature extremes, UV, ozone, acid rain and road salt.

Figure 3:
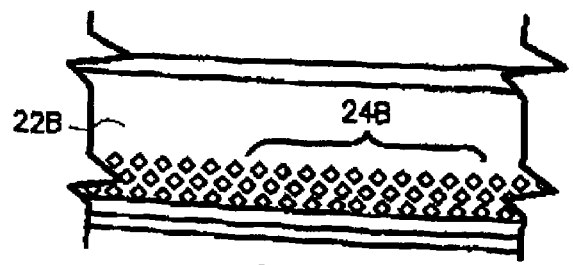
FIG. 3 is a partial sectional view of the present invention showing the support structure and the specific scrubbing configuration projecting from one of the blades surfaces near the window interface for an alternate embodiment.

As shown in FIG. 3, it is contemplated by the Applicant that other plurality of scrubbing configurations, such as a diamond shape 24b, can be utilized to achieve the advantages of the present invention wiper blade 20. In this alternate embodiment the plurality of diamond shaped scrubbing configurations 24b project from the outside surface of each blade is employed. The plurality of diamond shaped scrubbing configurations 24b function by first engaging and impinging a piece of debris with the tip or pointed end of one of the sides of the diamond shaped configuration 24b. Then the piercing small radius is followed by the wider section of the diamond shaped configuration 24b, which functions to split and shatter the engaged piece of debris. As shown in this FIG. 3, three rows of diamond shaped scrubbing configurations 24b are used to perform the additional wiping and cleaning operations. It is contemplated by the Application that more or less than the three rows of diamond shaped scrubbing configurations 24b can be utilized.

The plurality of diamond shaped scrubbing configurations 24b can be molded into the blade design and fabricated from the same material as the base strip 34. In addition, the plurality of triangular scrubbing configurations 24b can fabricated from a different material than the base material (or the same material) and attached to the portion of the blade by standard techniques, e.g. heat or adhesive attachments technology. In this example the triangular scrubbing configurations 24b can be fabricated from a number of materials, such as natural rubber or silicone materials while the base strip is fabricated from another material. Alternately the diamond shaped scrubbing configurations 24b can be fabricated from a synthetic or composite compound or halogen-hardened natural compound that reduces lengthens the diamond shaped scrubbing configurations 24b life by reducing fatigue attributed to abrasion, temperature extremes, UV, ozone, acid rain and road salt.

Figure 4:
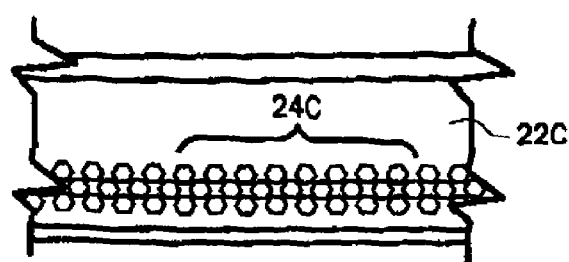
FIG. 4 is a partial sectional view of the present invention showing the support structure and the specific scrubbing configuration projecting from one of the blades surfaces near the window interface for the primary embodiment.

As shown in FIG. 4, it is contemplated by the Applicant that another plurality of scrubbing configurations, such as a hexagon shape 24c, can be utilized to achieve the advantages of the present invention wiper blade 20. In this alternate embodiment the plurality of hexagon shaped scrubbing configurations 24c project from the outside surface of each blade is employed. The plurality of hexagon shaped scrubbing configurations 24c function by first engaging and impinging a piece of debris with the tip or point of one of the pointed ends of the hexagon shaped configuration 24c. Then the piercing small radius is followed by the wider section of the hexagon shaped configuration 24c, which functions to split and shatter the engaged piece of debris.

The plurality of hexagon shaped scrubbing configurations 24c can be molded into the blade design and fabricated from the same material as the base strip 34. In addition, the plurality of hexagon scrubbing configurations 24c can fabricated from a different material than the base material (or the same material) and attached to the portion of the blade by standard techniques, e.g. heat or adhesive attachments technology. In this example the hexagon shaped scrubbing configurations 24c can be fabricated from a number of materials, such as natural rubber or silicone materials while the base strip is fabricated from another material. Alternately the hexagon shaped scrubbing configurations 24c can be fabricated from a synthetic or composite compound or halogen-hardened natural compound that reduces lengthens the diamond shaped scrubbing configurations 24c life by reducing fatigue attributed to abrasion, temperature extremes, UV, ozone, acid rain and road salt. As shown in this FIG. 4, three rows of hexagon shaped scrubbing configurations 24c are used to perform the additional wiping and cleaning operations. It is contemplated by the Application that more or less than the three rows of hexagon shaped scrubbing configurations 24c can be utilized. It is also contemplated by the Applicant can use other shapes, such as pentagons, octagons, etc. to achieve the performance characteristics of the present invention wiper blade 20.

It is also contemplated by the Application that a combination of specifically shaped scrubbing configurations might be employed. As an example (not shown), the first row can be triangle shaped scrubbing configurations 24a, the second row diamond shaped scrubbing configurations 24b, and the third row hexagon shaped scrubbing configurations 24c. In addition, a mixture of specifically shaped scrubbing configurations can be used. For example (not shown), any row can contain a series of triangle shaped scrubbing configurations 24a, followed by a series of hexagon shaped scrubbing configurations 24c and then followed by a series of diamond shaped scrubbing configurations 24b, and then this series can be repeated as many times as necessary to complete the row and provide the performance characteristics of the present invention wiper blade 20.

The plurality of specific scrubbing elements 24a, 24b and 24c can use typical molding techniques to achieve the specific design of the present invention. In this situation, the wiper blade 20 and the plurality of specific scrubbing elements 24a, 24b and 24c will generally be fabricated from the same elastomeric material. There are other molding techniques, such as insert molding technology, that can embed the specific scrubbing elements 24a, 24b and 24c into the wiper blade surface. In this situation, the wiper blade 20 and the specific scrubbing elements 24a, 24b and 24c may be fabricated from different materials. In addition, the plurality of specific scrubbing elements 24a, 24b and 24c can be attached to the sloping surface of the wiper blade using typical adhesive technology. In this situation, the wiper blades and the specific scrubbing elements 24a, 24b and 24c may be fabricated from different materials.

Typical materials for fabricating the base 34a, 34b and 34c, wiper blade 20 or the specific scrubbing elements 24a, 24b and 24c are natural rubber, styrene-butadiene rubber, synthetic polyisoprene rubber, isoprene-butadiene rubber and/or styrene-isoprene-butadiene rubber, silicone rubber compositions, polydioganosiloxanes, cis-1,4-polybutadiene rubber combined with other rubbery polymers, such as natural rubber, synthetic compounds or halogen-hardened natural compounds that reduces windshield "chatter" and lengthen the wiper blade life by reducing fatigue attributed to abrasion, temperature extremes, UV, ozone, acid rain and road salt, and any combinations thereof.

In addition, the base 34a, 34b and 34c and the wiper blade 20 can be fabricated from a composite structure that combines a soft pliable rubber on the squeegee smooth surface for good wiping characteristics with a firm rubber in the blade body for improved support and durability.

In the manufacturing techniques were the specific scrubbing elements 24a, 24b and 24c can be a different material than the wiper blade 20 or the base 34a, 34b and 34c, the specific scrubbing elements 24a, 24b and 24c may be fabricated from materials with a higher modulus such as polyimides, polyesters, nylon, polystyrene and any combinations thereof. In some application, even harder materials with very high modulus and strength characteristics might be used to fabricate the specific scrubbing elements 24a, 24b and 24c.

FIG. 5 shows in more details a cross sectional view of the present invention showing the support structure and having a plurality of specifically configured blades 30a and 30b extending from a single piece base structure 34a. Generally, the first blade structure 30a is comprised of a first base stem 32a which extends from a common base 34a, an inside wing structure 33a and an outside wing structure 33b, and terminating in an inside sloping surface (38a) and an outside sloping surface (36a). The other corresponding second blade structure 30b is comprised of a second base stem 32b extending from the a common base 34a, an inside wing structure 35b and an outside wing structure 35a, and terminating in an inside sloping surface 38b and an outside sloping surface 36b. The single base 34a is encased within a groove in a support structure 40a designed to receive the present invention wiper blade base 34a. The support structure 40a has a pair of ears 42 for attaching to arm 14.

FIG. 6 shows in more details is a cross sectional view of the present invention showing the support structure and having a plurality of specifically configured blades extending from a multiple piece base structure. Generally, the first blade structure 30a extends from a first base 34b and is comprised of a base stem 32a, an inside wing structure 33b and an outside wing structure 33a, and terminating in an inside sloping surface 38a and an outside sloping surface 36a. The other corresponding second blade structure 30b is comprised of a base stem 32b, an inside wing structure 35a and an outside wing structure 35b, and terminating in an inside sloping surface (38b) and an outside sloping surface 36b. Both the first base and the second base 34b are encased within a pair of grooves in a support structure 40b designed to receive the two independent wiper blade bases 34a and 34b. The support structure 40b also can have a cross member 44 that is position between the two bases 34a and 34b which functions to strengthen the support structure.

FIG. 7 is a cross sectional view of the present invention showing the support structure and having one specifically configured blade extending from a single piece base structure.

Generally, the single blade structure 30 is comprised of a base stem 32, an inside wing structure 33a and an outside wing structure 33b, and terminating in an inside sloping surface (38a) and an outside sloping surface (36a).

FIG. 8a is a magnified view of a blades 30, 30a and 30b having an sloping surface of a blade with an inside 38a and 38b and outside surface 36 and 36b, and having the specific scrubbing configurations 24a, 24b and 24c projecting from the outside surface 36a and 36b of the wiper blade 20 near the window interface. The specific scrubbing configurations 24a, 24b and 24c are located near the terminal end 28 of the sloping surface of the wiper blade such that when the wiper blade 20 flexes or is biased during normal cleaning operations, the plurality of specific scrubbing configurations 24a, 24b and 24c substantially engaged the windshield surface along the length of the wiper blade 20.

FIG. 8b is a magnified view of a blade 30, 30b, 30c having an sloping surface of a blade with an inside 38a and 38b and outside surface 36a and 36b, and having the specific scrubbing configurations 24a, 24b and 24c projecting from both the outside surface 36a and 36b and the inside surface 38a and 38b of the wiper blade 20 near the window interface. The specific scrubbing configurations 24a, 24b and 24c are located near the terminal end 28 of the sloping surface of the wiper blade such that when the wiper blade 20 flexes or is biased during normal cleaning operations, the plurality of specific scrubbing configurations 24a, 24b and 24c substantially engaged the windshield surface along the length of the wiper blade 20.

The invention claimed is:

1. A wiper blade for scrubbing and cleaning a surface of glass and polymeric windows, comprising:
    an elongated body made of elastomeric material, said body defining a base portion and a blade portion projecting therefrom, said blade portion having an inside surface and an outside surface, said blade portion having a terminal end that in operation is in close proximity to the window surface;
    an array including at least one row extending along the blade portion, each row including a plurality of discrete, specifically shaped scrubbing configurations that are independent and non-continuous along the length of the blade portion protruding from a said outside surface of said blade portion, each scrubbing configuration having a reduced radii side and being tapered towards a free end thereof, whereby said reduced radii side is designed to be substantially directed towards the window surface at a angle and provide substantially point contact at its free end with the window surface, as the blade flexes in operation, to engage and impinge debris on said window;
    whereby at least one of the plurality of specifically shaped scrubbing configurations are located near the terminal end of the blade portion;
    whereby each of the plurality of specifically shaped scrubbing configurations has, in a transverse cross section as it protrudes from the outside surface, a shape defining at least one linear side, and
    said inside surface having a substantially smooth surface, said inside surface designed to collect and remove moisture and debris from the window surface.

2. The wiper blade according to claim 1, wherein the specifically shaped scrubbing configurations are substantially triangular in shape.

3. The wiper blade according to claim 1, wherein the specifically shaped scrubbing configurations are substantially diamond in shape.

4. The wiper blade according to claim 1, wherein the specifically shaped scrubbing configurations are substantially hexagon in shape.

5. The wiper blade according to claim 1, wherein said specifically shaped scrubbing configurations are molded into the blade.

6. The wiper blade according to claim 1, wherein said specifically shaped scrubbing configurations are attached to said blade using an adhesive.

7. The wiper blade according to claim 1, wherein said specifically shaped scrubbing configurations are attached to said blade using heat bonding technology.

8. The wiper blade according to claims 1, wherein said specifically shaped scrubbing configurations function to engage and impinge a piece of debris with a tip or pointed end of one of the sides of the plurality of specifically shaped configurations, that piercing with a small radius is followed by a wider section of the specifically shaped configuration which splits or shatters the engaged piece of debris.

9. A wiper blade for scrubbing and cleaning a surface of glass and polymeric windows comprising:
    a dual design consisting a first elongated body and a second elongated body made of elastomeric material, said first body defining a base portion and a blade portion projecting therefrom, said blade portion having an inside surface and an outside surface, said blade portion having a terminal end that in operation is in close proximity to the window surface and said second body defining a base portion and a blade portion projecting therefrom, said blade portion having an inside surface and an outside surface, said blade portion having a terminal end that in operation is in close proximity to the window surface;
    an array including at least one row extending along each of said first and said second blade portion, each row including a plurality of discrete, specifically shaped scrubbing configurations that are independent and non-continuous along the length of each blade portion protruding from each said outside surface thereof, each scrubbing configuration having a reduced radii side and being tapered towards a free end thereof, whereby said reduced radii side is designed to be substantially directed towards the window surface at a angle and provide substantially point contact at its free end with the window surface, as the blade flexes in operation, to engage and impinge debris on said window;
    whereby at least one of the plurality of specifically shaped scrubbing configurations are located near the terminal end of each blade portion;
    whereby each of the plurality of specifically shaped scrubbing configurations has, in a transverse cross section as it protrudes from the respective outside surface, a shape defining at least one linear side, and
    each of said inside surfaces having a substantially smooth surface, said inside surfaces designed to collect and remove moisture and debris from the window surface.

10. The wiper blade according to claim 9, wherein the specifically shaped scrubbing configurations are substantially triangular in shape.

11. The wiper blade according to claim 9, wherein the specifically shaped scrubbing configurations are substantially diamond in shape.

12. The wiper blade according to claim 9, wherein the specifically shaped scrubbing configurations are substantially hexagon in shape.

13. The wiper blade according to claim 9, wherein said specifically shaped scrubbing configurations are molded into the blade.

14. The wiper blade according to claim 9, wherein said specifically shaped scrubbing configurations are attached to said blade using an adhesive.

15. The wiper blade according to claim 9, wherein said specifically shaped scrubbing configurations are attached to said blade using heat bonding technology.

16. The wiper blade according to claims 9, wherein said specifically shaped scrubbing configurations function to engaging and impinging a piece of debris with a tip or pointed end of one of the sides of the plurality of specifically shaped configurations, that piercing with a small radius is followed by a wider section of the specifically shaped configuration which splits or shatters the engaged piece of debris.

17. A wiper blade for scrubbing and cleaning a surface of glass and polymeric windows comprising:
   a pair of elastomeric wiper blades consisting of a first elongated body and a second elongated body made of elastomeric material, said first body defining a base portion and a blade portion projecting therefrom, said blade portion having an inside surface and an outside surface, said blade portion having a terminal end that in operation is in close proximity to the window surface and said second body defining a base portion and a blade portion projecting therefrom, said blade portion having an inside surface and an outside surface, said blade portion having a terminal end that in operation is in close proximity to the window surface;
   an array including at least one row extending along each of said first and said second blade portion, each row including a plurality of discrete, specifically shaped scrubbing configurations that are independent and non-continuous along the length of each blade portion protruding from each said outside surface thereof, each scrubbing configuration having a reduced radii side and being tapered towards a free end thereof, whereby said reduced radii side is designed to be substantially directed towards the window surface at a angle and provide substantially point contact at its free end with the window surface, as the blade flexes in operation, to engage and impinge debris on said window;
   whereby at least one of the plurality of specifically shaped scrubbing configurations are located near the terminal end of each blade portion;
   whereby each of the plurality of specifically shaped scrubbing configurations has, in a transverse cross section as it protrudes from the respective outside surface, a shape defining at least one linear side, and each of said inside surfaces having a substantially smooth surface, said inside surfaces designed to collect and remove moisture and debris from the window surface.

18. The wiper blade according to claim 17, wherein the specifically shaped scrubbing configurations are substantially triangular in shape.

19. The wiper blade according to claim 17, wherein the specifically shaped scrubbing configurations are substantially diamond in shape.

20. The wiper blade according to claim 17, wherein the specifically shaped scrubbing configurations are substantially hexagon in shape.

21. The wiper blade according to claim 17, wherein said specifically shaped scrubbing configurations are molded into the blade.

22. The wiper blade according to claim 17, wherein said specifically shaped scrubbing configurations are attached to said blade using an adhesive.

23. The wiper blade according to claim 17, wherein said specifically shaped scrubbing configurations are attached to said blade using heat bonding technology.

24. The wiper blade according to claims 17, wherein said specifically shaped scrubbing configurations function to engaging and impinging a piece of debris with a tip or pointed end of one of the sides of the plurality of specifically shaped configurations, that piercing with a small radius is followed by a wider section of the specifically shaped configuration which splits or shatters the engaged piece of debris.

* * * * *